Nov. 3, 1953    F. McGOWEN    2,657,675
CRANKSHAFT REAR BEARING SEAL
Filed June 24, 1950    2 Sheets-Sheet 1

INVENTOR.
Frank McGowen
BY
Hauker Hardesty
Attorneys.

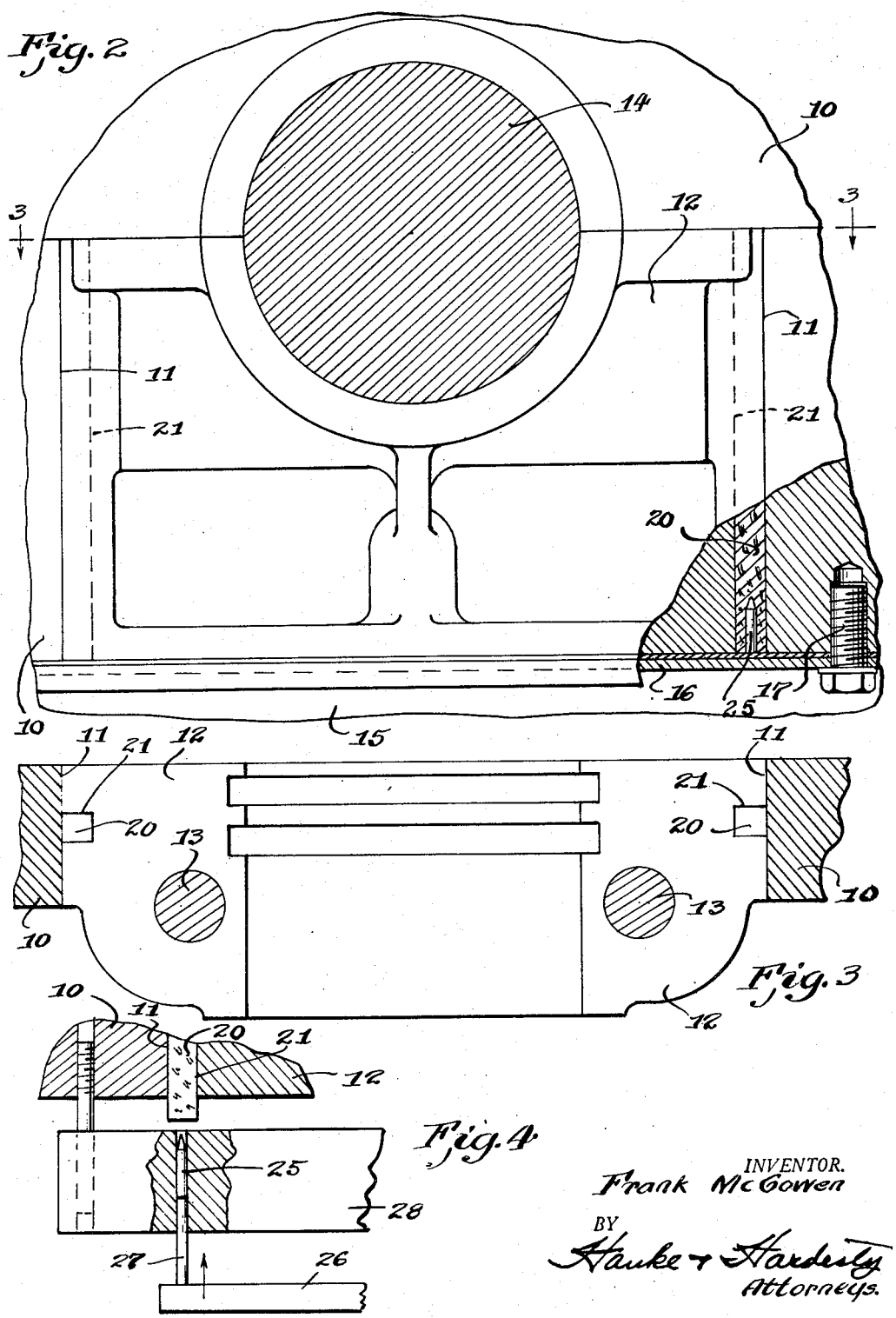

Patented Nov. 3, 1953

2,657,675

UNITED STATES PATENT OFFICE 2,657,675

CRANKSHAFT REAR BEARING SEAL

Frank McGowen, Twin Lakes, Mich., assignor to Continental Motors Corporation, Muskegon, Mich., a corporation of Virginia Application June 24, 1950, Serial No. 170,222

5 Claims. (Cl. 121—194)

My invention relates to a bearing seal and more particularly to a seal adapted for assembly with rear crankshaft bearing of an internal combustion engine. This type of seal is particularly applicable to an engine wherein the rear main bearing is fitted into a recess of the engine block and with engines having the crank centerline above the oil pan contact.

Sealing strips of cork or other suitable material are fitted into keyway slots in the block or bearing and serve to seal against leaks around the bearing. Much difficulty has been experienced in keeping these sealing strips in place, particularly since such engines are conveyed on an assembly line and considerable time elapses before oil pan is finally assembled. These sealing strips often become loose or otherwise misplaced.

An object of the present invention is to eliminate the above difficulties by providing a seal which is more securely assembled, thereby avoiding many production difficulties.

For a more detailed understanding of the invention reference may be had to the accompanying drawings illustrating a preferred embodiment of the invention in which like characters refer to like parts throughout the several views, and in which Fig. 1 is an elevational view of the rear end of an internal combustion engine;

Fig. 2 is an enlarged elevational view of a rear engine bearing showing parts thereof in section;

Fig. 3 is a plan view of the rear engine bearing taken substantially on the line 3—3 of Fig. 2, but shown with the crankshaft removed; and Fig. 4 is a fragmentary detail view showing how the sealing strip is assembled in place.

Figure 1:
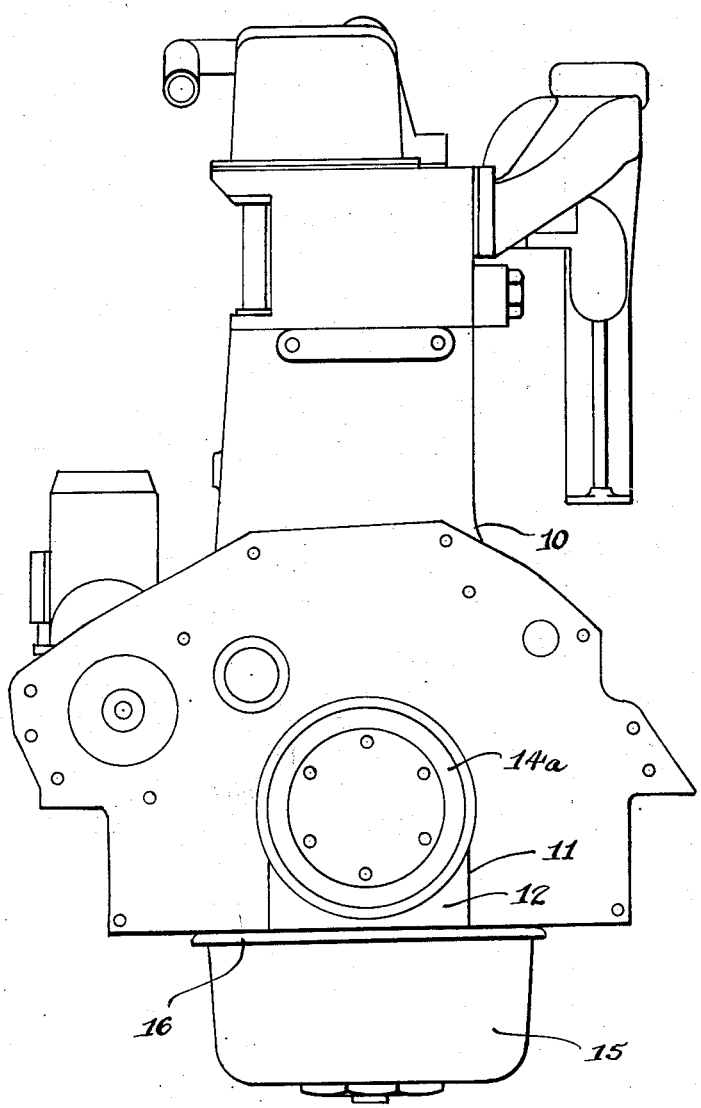

The component parts of the engine and rear bearing structure as shown in the accompanying drawings are generally conventional. The engine comprises a cylinder block 10 provided at the rear end with a recess 11 for receiving a crankshaft bearing 12, said bearing being preferably secured to the cylinder block by bolts 13 or other securing means and arranged to support the crankshaft 14. Fig. 1 shows the usual flywheel flange 14a as secured to the rear end of the crankshaft, and the oil pan 15 which is secured to the underside of the cylinder block, the flange 16 of said oil pan disposed on the under side of the crank bearing and secured to the engine cylinder block such as by bolts 17.

A sealing strip, preferably a cork strip 20, is driven into a slot 21 in the side wall of the bearing, and is compressed and retained therein by reason of the flange 16 of the oil pan, which flange (see Fig. 2) abuts the end of the cork strip. This sealing strip serves to seal against leakage of oil between the bearing and cylinder block.

These sealing strips 20, and cork strips are most desired, are constructed initially with a length greater than the length of the slot 21 so as to initially slightly project, as seen in Fig. 4. A press is employed to force the sealing strip into the slot and preferably some suitable machine tool is employed to drive a wooden pin 25 into the cork sealing strip. Preferably the ram 26 carrying plungers or pins 27 is first advanced towards the bearing and said pins 27 will strike the pin 25, and force same into the end of the cork sealing strip as shown in Fig. 2. At the same time the ram 26 engages the pressure plate 28 and presses the cork strip into the slot. This places the cork strip under compression, and the compressed strip is thus forceably engaged tightly with the wall of the slot and with that portion of the wall of the cylinder block recess engaged by said strip. The purpose of the wooden pin is to more securely retain the cork strip in the slot, because this wooden pin 25, on being driven into the end of the cork strip, expands the cork even more against the side walls of the slot.

I claim:

1. In an internal combustion engine, an engine block, a crankshaft bearing member supported by said engine block and having a surface fitted with and engaged with a surface of the engine block, and means for sealing the said engaging surfaces comprising a strip interlocked between said engaging surfaces and compressed therein to expand said strip into a tight engagement with said surfaces, and a pin driven into said strip to further expand a portion of said strip into tight engagement with said surfaces.

2. In an internal combustion engine, an engine block, a crankshaft bearing member supported by said block and having a surface fitted with and engaged with a surface of the engine block, one of said surfaces having a slot, a compressible sealing strip compressed in said slot and expanded into pressure contact with said other surface, and a pin driven into the end of said strip to further laterally expand a portion of said strip into tight engagement with the walls of said slot and said other surface.

3. In an internal combustion engine, an engine block, a crankshaft bearing member supported by said block and having a surface fitted with and engaged with a surface of the engine block, one of said surfaces having a slot, a compressible cork strip having an original length before assembly greater than the length of said slot, said compressible cork strip driven end ways into said slot under pressure whereby to yieldingly engage the end portion of said strip with the walls of the slot and the other surface, and a pin forcibly driven into the compressed portion of said strip to further laterally expand same into tight engagement with the said walls of the slot and said other surface.

4. In an internal combustion engine, an engine block, a crankshaft bearing member supported by said block and having a surface fitted with and engaged with a surface of the engine block, one of said surfaces having a slot, a compressible cork strip having an original length before assembly greater than the length of said slot, said compressible cork strip driven end ways into said slot under pressure whereby to yieldingly engage the end portion of said strip with the walls of the slot and the other surface, and a wooden pin forcibly driven into the compressed portion of said strip to further laterally expand same into tight engagement with the walls of said slot and said other surface.

5. In an internal combustion engine, an engine block having a recessed portion, an engine structural member having a slot in an outer surface thereof and disposed for assembly within the recess of said engine block, a compressible cork strip having an original length greater than the length of said slot and driven endways into said slot under pressure whereby to yieldingly engage the outer end portion of said strip with the walls of the slot and the adjacent surface of the engine block recess, and a pin forcibly driven endways into the compressed portion of said strip to further laterally expand same into tight engagement with the surface of said engine block recess and the walls of said slot.

FRANK McGOWEN.

References Cited in the file of this patent

UNITED STATES PATENTS

| Number | Name | Date |
|---|---|---|
| 719,547 | Willoughby | Feb. 3, 1903 |
| 1,723,306 | Sipe | Aug. 6, 1929 |
| 1,779,088 | Davis | Oct. 21, 1930 |
| 2,226,596 | Swenson | Dec. 31, 1940 |
| 2,303,093 | Schreck | Nov. 24, 1942 |
| 2,468,976 | Herreshoff et al. | May 3, 1949 |